US012634773B2

(12) United States Patent
Xie et al.

(10) Patent No.: US 12,634,773 B2
(45) Date of Patent: May 19, 2026

(54) METHOD OF UE ASSISTED ENABLEMENT FROM UE TO NETWORK ON PREFERRED RESOURCE IN A MULTI-SIM DEVICE

(71) Applicant: QUALCOMM Incorporated, San Diego, CA (US)

(72) Inventors: Ling Xie, Beijing (CN); Tom Chin, San Diego, CA (US); Reza Shahidi, La Jolla, CA (US); Qingxin Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 671 days.

(21) Appl. No.: 18/003,708

(22) PCT Filed: Aug. 7, 2020

(86) PCT No.: PCT/CN2020/107927
§ 371 (c)(1),
(2) Date: Dec. 29, 2022

(87) PCT Pub. No.: WO2022/027632
PCT Pub. Date: Feb. 10, 2022

(65) Prior Publication Data
US 2023/0262543 A1 Aug. 17, 2023

(51) Int. Cl.
*H04W 36/00* (2009.01)
*H04L 5/00* (2006.01)
(Continued)

(52) U.S. Cl.
CPC ....... *H04W 36/0072* (2013.01); *H04L 5/0096* (2013.01); *H04W 72/02* (2013.01); *H04W 36/142* (2023.05); *H04W 88/06* (2013.01)

(58) Field of Classification Search
CPC ............. H04W 36/0072; H04W 72/02; H04W 36/142; H04W 88/06; H04W 36/0058; H04L 5/0096
See application file for complete search history.

(56) References Cited

U.S. PATENT DOCUMENTS

2011/0077031 A1* 3/2011 Kim ................. H04W 52/0251
455/458
2015/0126187 A1* 5/2015 Ponukumati .......... H04W 16/14
455/434

(Continued)

FOREIGN PATENT DOCUMENTS

CN      106454965 A    2/2017
CN      110495209 A    11/2019

OTHER PUBLICATIONS

3GPP TS 38.331 V16.1.0 (Jul. 2020), 5G; NR; Radio Resource Control (RRC); Protocol specification (3GPP TS 38.331 version 16.1.0 Release 16) (Year: 2020).*

(Continued)

*Primary Examiner* — Justin T Van Roie
(74) *Attorney, Agent, or Firm* — QUALCOMM Incorporated

(57) ABSTRACT

Aspects of the present disclosure relate to wireless communications, and more particularly, to techniques that may help optimize performance of a multi-SIM UE. According to certain aspects, the multi-SIM UE may determine a preferred frequency resource for the UE to support at least two subscriber identity modules (SIMs), at least one of which is connected and one of which is idle and provide, via the at least one connected SIM, an indication of the preferred frequency resource to a network entity.

31 Claims, 10 Drawing Sheets

(51) Int. Cl.
    *H04W 72/02*       (2009.01)
    *H04W 36/14*       (2009.01)
    *H04W 88/06*       (2009.01)

(56)           References Cited

U.S. PATENT DOCUMENTS

| | | | |
|---|---|---|---|
| 2015/0139015 A1* | 5/2015 | Kadous ............. | H04W 36/0085 |
| | | | 370/252 |
| 2020/0106674 A1* | 4/2020 | Van Der Velde ..... | H04W 24/10 |
| 2021/0014667 A1* | 1/2021 | Lovlekar .............. | H04W 12/72 |

OTHER PUBLICATIONS

Apple, 3GPP TSG-RAN WG2 Meeting #103bis R2-1815062, "Requesting to enter RRC Inactive state", Oct. 8-12, 2018 (Year: 2018).*

International Search Report and Written Opinion—PCT/CN2020/107927—ISA/EPO—May 7, 2021.

Nec, et al., "Solution X: Paging Delivery for USIM_2 While USIM_1 is in Connected Mode on the Same Network", SA WG2 Meeting #136, S2-1911347, Nov. 18-22, 2019 (Nov. 22, 2019), 3 pages, The whole document.

VIVO (Moderator): "Report of Phase 1 Multi-SIM Email Discussion", 3GPP Draft, 3GPP TSG-RAN WG Meeting #85, RP-191898, 3rd Generation Partnership Project (3GPP), Mobile Competence Centre, 650, Route Des Lucioles, F-06921 Sophia-Antipolis Cedex, France, Newport Beach, USA, Sep. 16-20, 2019, Sep. 20, 2019, 36 Pages, XP051782444.

\* cited by examiner

500

502

DETERMINE A PREFERRED FREQUENCY RESOURCE FOR THE UE TO
SUPPORT AT LEAST TWO SUBSCRIBER IDENTITY MODULES (SIMS),
AT LEAST ONE OF WHICH IS CONNECTED AND ONE OF WHICH IS IDLE

504

PROVIDE, VIA THE AT LEAST ONE CONNECTED SIM, AN INDICATION
OF THE PREFERRED FREQUENCY RESOURCE TO A NETWORK ENTITY

600

1000

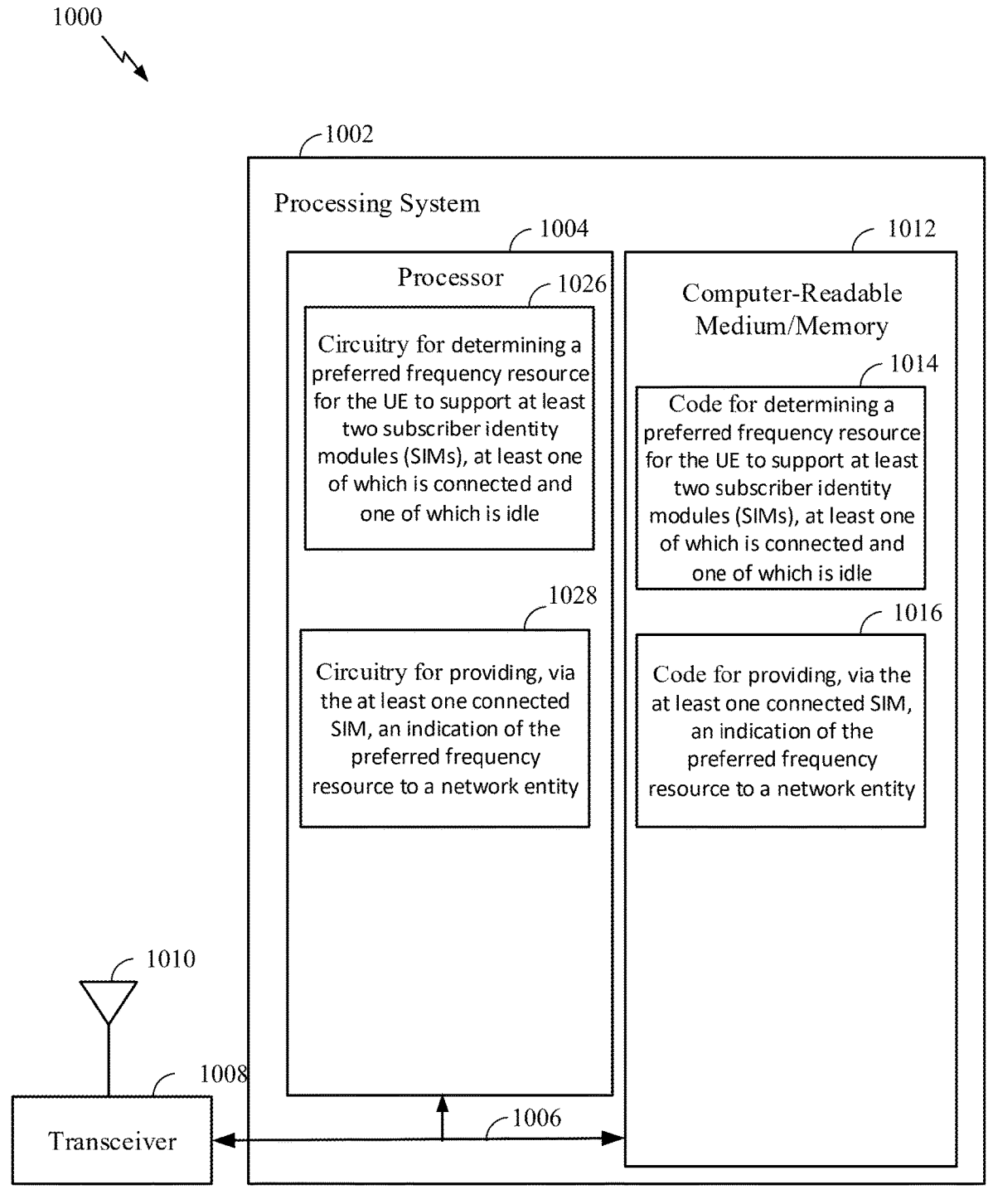

1002

Processing System

1004

Processor     1026

Circuitry for determining a preferred frequency resource for the UE to support at least two subscriber identity modules (SIMs), at least one of which is connected and one of which is idle

1028

Circuitry for providing, via the at least one connected SIM, an indication of the preferred frequency resource to a network entity

1012

Computer-Readable Medium/Memory

1014

Code for determining a preferred frequency resource for the UE to support at least two subscriber identity modules (SIMs), at least one of which is connected and one of which is idle

1016

Code for providing, via the at least one connected SIM, an indication of the preferred frequency resource to a network entity

1010

1008

Transceiver

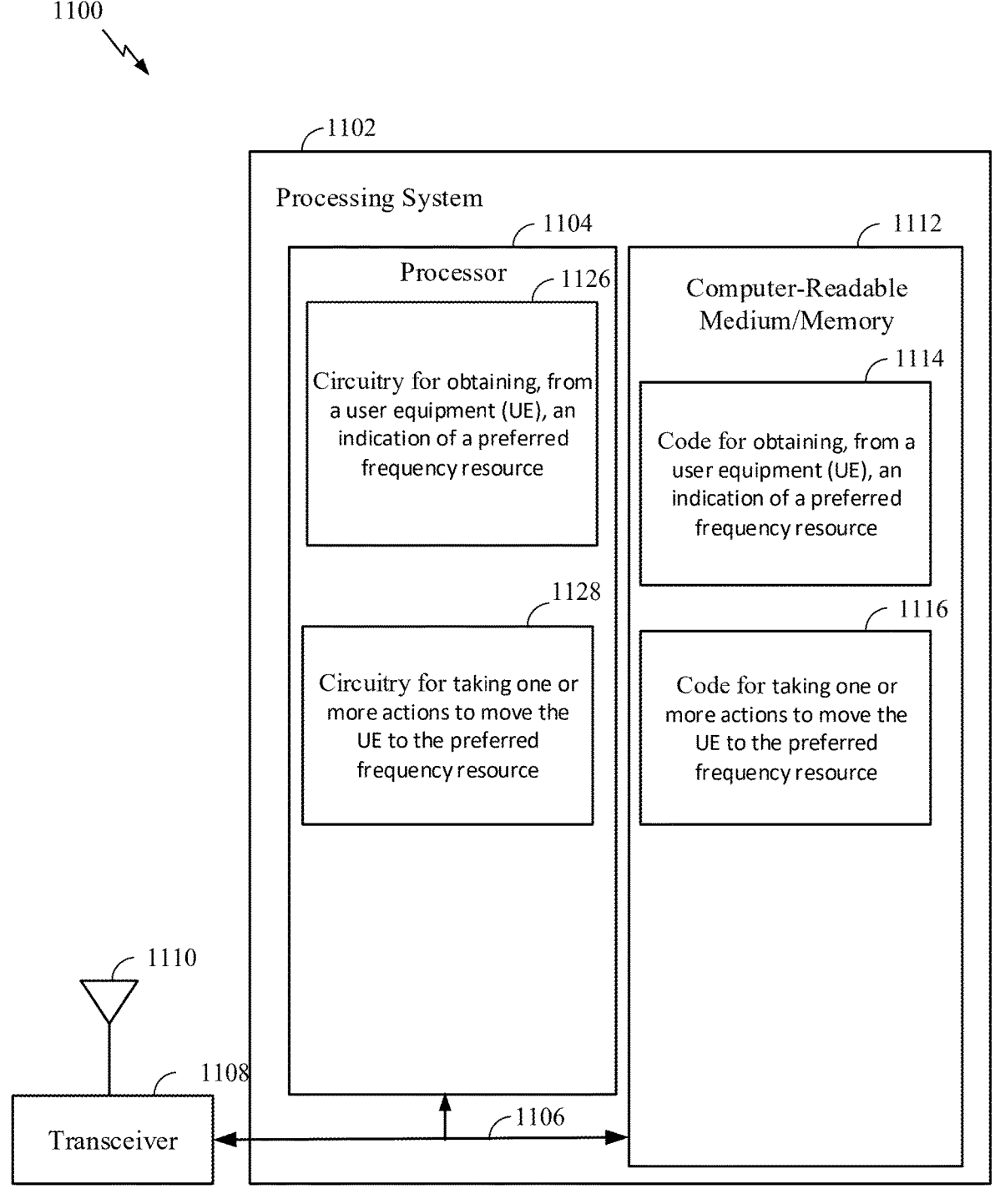

1100

1102

Processing System

1104

1112

Processor          1126

Computer-Readable
Medium/Memory

Circuitry for obtaining, from
a user equipment (UE), an
indication of a preferred
frequency resource

1114

Code for obtaining, from a
user equipment (UE), an
indication of a preferred
frequency resource

1128

Circuitry for taking one or
more actions to move the
UE to the preferred
frequency resource

1116

Code for taking one or
more actions to move the
UE to the preferred
frequency resource

1110

1108

Transceiver

METHOD OF UE ASSISTED ENABLEMENT FROM UE TO NETWORK ON PREFERRED RESOURCE IN A MULTI-SIM DEVICE

CROSS-REFERENCE TO RELATED APPLICATIONS

This application is a national stage application under 35 U.S.C. 371 of PCT/CN2020/107927, filed Aug. 7, 2020, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques for a mechanism to provide an indication of a preferred resource in a multi-subscriber identity module (MSIM) user equipment (UE).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless nodes to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved performance of UEs operating with one or more SIMS.

Certain aspects provide a method for wireless communications by a user-equipment (UE). The method generally includes determining a preferred frequency resource for the UE to support at least two subscriber identity modules (SIMs), at least one of which is connected and one of which is idle and providing, via the at least one connected SIM, an indication of the preferred frequency resource to a network entity.

Certain aspects provide a method for wireless communications by a network entity. The method generally includes receiving, from a user equipment (UE), an indication of a preferred frequency resource and taking one or more actions to move the UE to the preferred frequency resource.

Certain aspects provide a user-equipment (UE). The UE generally includes means for determining a preferred frequency resource for the UE to support at least two subscriber identity modules (SIMs), at least one of which is connected and one of which is idle and means for providing, via the at least one connected SIM, an indication of the preferred frequency resource to a network entity.

Certain aspects provide a network entity. The network entity generally includes means for receiving, from a user equipment (UE), an indication of a preferred frequency resource and means for taking one or more actions to move the UE to the preferred frequency resource.

Certain aspects provide a user-equipment (UE). The UE generally includes a processing system configured to determine a preferred frequency resource for the UE to support at least two subscriber identity modules (SIMs), at least one of which is connected and one of which is idle, an interface configured to provide, via the at least one connected SIM, an indication of the preferred frequency resource, and a transmitter configured to transmit the indication a network entity.

Certain aspects a network entity. The network entity generally includes a receiver configured to receive, from a user equipment (UE), an indication of a preferred frequency resource, and a processing system configured to take one or more actions to move the UE to the preferred frequency resource.

Certain aspects provide an apparatus for wireless communications by a user-equipment (UE). The apparatus generally includes a processing system configured to determine a preferred frequency resource for the UE to support at least two subscriber identity modules (SIMs), at least one of which is connected and one of which is idle and an interface configured to provide, via the at least one connected SIM, an indication of the preferred frequency resource.

Certain aspects provide an apparatus for wireless communications by a user-equipment (UE). The apparatus generally includes a receiver configured to receive, from a user equipment (UE), an indication of a preferred frequency resource and a processing system configured to take one or more actions to move the UE to the preferred frequency resource.

Certain aspects provide a computer-readable medium for wireless communications by a user equipment. The computer-readable medium generally includes codes executable to determine a preferred frequency resource for the UE to support at least two subscriber identity modules (SIMs), at least one of which is connected and one of which is idle and provide, via the at least one connected SIM, an indication of the preferred frequency resource to a network entity.

Certain aspects provide a computer-readable medium for wireless communications by a network entity. The computer-readable medium generally includes codes executable to obtain, from a user equipment (UE), an indication of a preferred frequency resource and take one or more actions to move the UE to the preferred frequency resource.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 10 illustrates a communications device that may include various components configured to perform operations of FIG. 5 in accordance with aspects of the present disclosure.

FIG. 11 illustrates a communications device that may include various components configured to perform operations of FIG. 6 in accordance with aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for a multi-subscriber identity module (MSIM) UE to provide an indication of a preferred resource for MSIM operation. The preferred resource may be indicated, for example, as UE-assistance information. The preferred resource may be selected in an effort to optimize data delivery in MSIM scenarios.

The following description provides examples of prioritizing activities on SIM(s) of a UE in a communication system, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
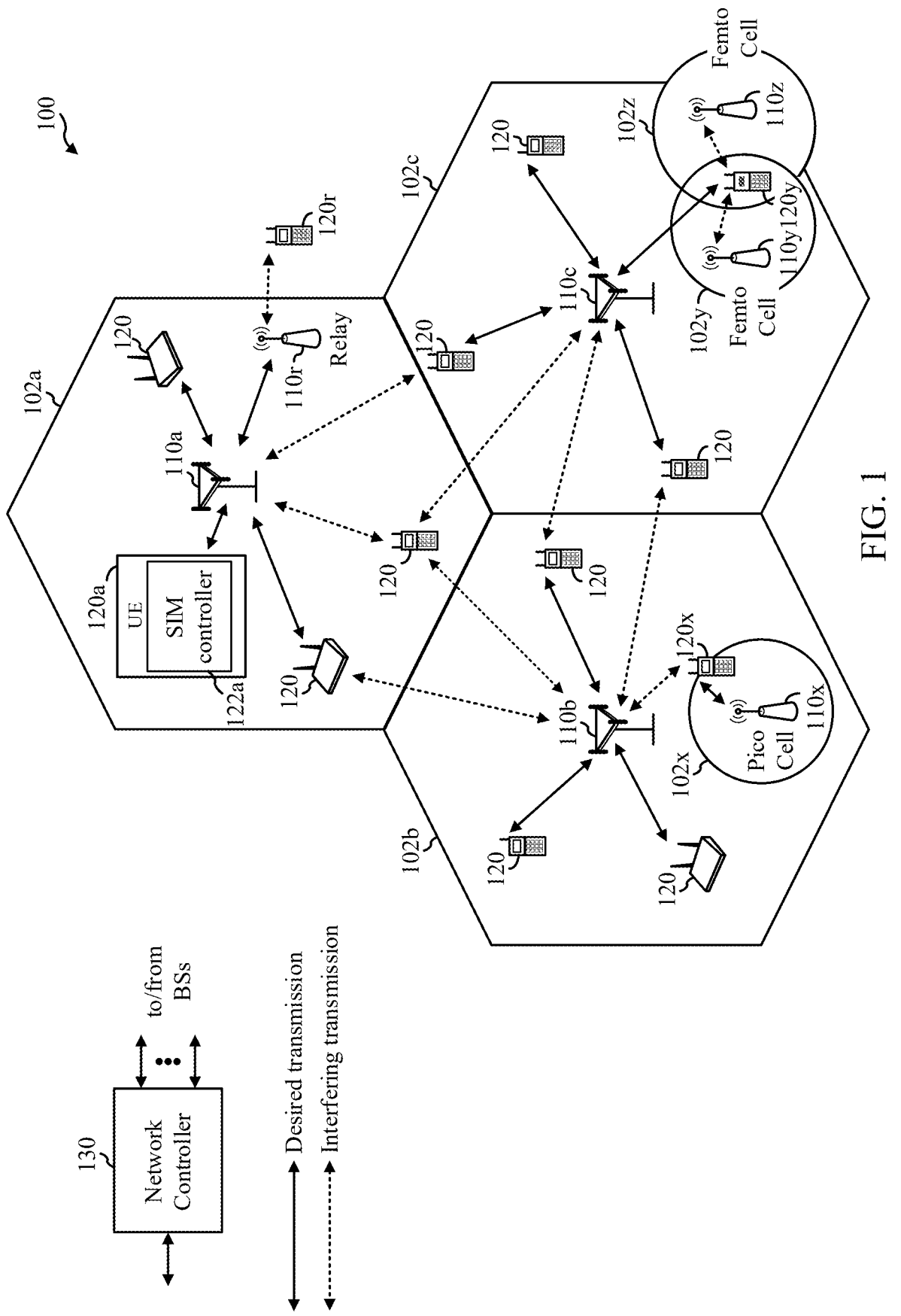
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, a UE 120a may support (or operate with) multiple SIMS and may have a SIM controller 122a configured perform (or assist UE 120a in performing) operations 500 of FIG. 5. Similarly, a BS 110a serving such a UE may be configured perform to perform operations 600 of FIG. 6. As will be described in greater detail below, operations 500 and 600 may allow an MSIM UE to provide an indication of a preferred resource for MSIM operation, which may help optimize MSIM data delivery.

As illustrated in FIG. 1, the wireless communication network 100 may include a number of base stations (BSs) 110*a-z* (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells. The BSs 110 communicate with user equipment (UEs) 120*a-y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE 120 may be stationary or mobile.

Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
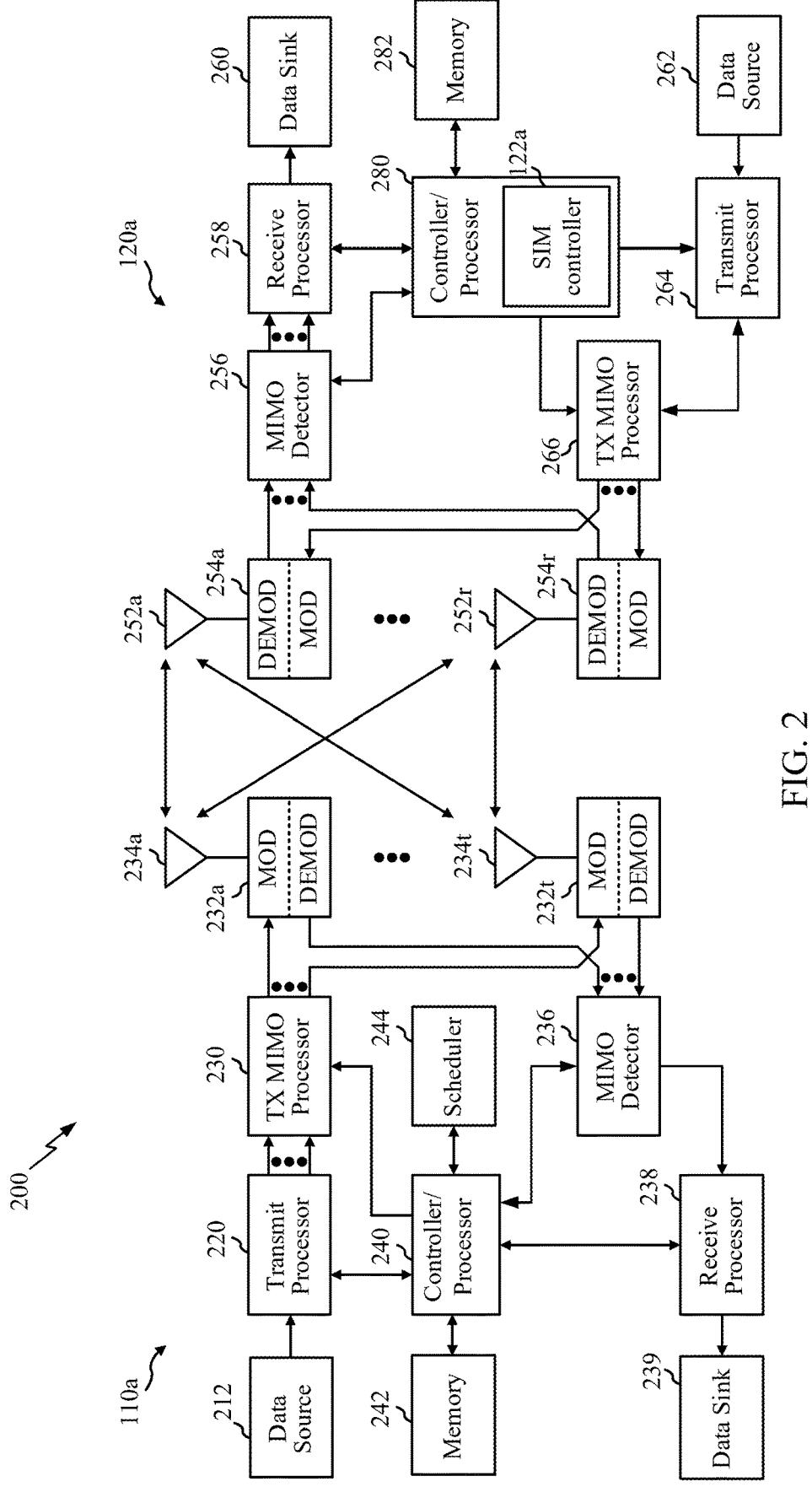
FIG. 2 is a block diagram conceptually illustrating a design of an example a base station (BS) and user equipment (UE), in accordance with certain aspects of the present disclosure.

FIG. 2 illustrates example components of BS 110*a* and UE 120*a* (e.g., in the wireless communication network 100 of FIG. 1), which may be used to implement aspects of the present disclosure. For example, one or more processors of UE 120*a* may support (or operate with) multiple SIMS and may have a SIM controller 122*a* configured perform (or assist UE 120*a* in performing) operations 500 of FIG. 5. Similarly, one or more processors of BS 110*a* may be configured perform to perform operations 600 of FIG. 6.

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a-232t*. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232*a-232t* may be transmitted via the antennas 234*a-234t*, respectively.

At the UE 120*a*, the antennas 252*a-252r* may receive the downlink signals from the BS 110*a* and may provide received signals to the demodulators (DEMODs) in transceivers 254*a-254r*, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254*a-254r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink, at UE 120*a*, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254*a-254r* (e.g., for SC-FDM, etc.), and transmitted to the BS 110*a*. At the BS 110*a*, the uplink signals from the UE 120*a* may be received by the antennas 234, processed by the modulators 232, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

The controller/processor 280 and/or other processors and modules at the UE 120*a* may perform or direct the execution of processes for the techniques described herein. For example, as shown in FIG. 2, the controller/processor 280 of the UE 120*a* has a SIM controller 122*a*, which is configured to implement one or more techniques described herein with reference to FIG. 5.

In some examples, access to the air interface may be scheduled. A scheduling entity (e.g., a BS 110) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs 110 are not the only network entities that may function as a scheduling entity. In some examples, a UE 120 may function as a scheduling entity and may schedule resources for one or more subordinate entities (e.g., one or more other UEs 120), and the other UEs 120 may utilize the resources scheduled by the UE 120 for wireless communication. In some examples, a UE 120 may function as a scheduling entity in a peer-to-peer (P2P) network, and/or in a mesh network. In a mesh network example, UEs 120 may communicate directly with one another in addition to communicating with a scheduling entity.

In some examples, the communication between the UEs 120 and BSs 110 is referred to as the access link. The access link may be provided via a Uu interface. Communication between devices may be referred as the sidelink.

In some examples, two or more subordinate entities (e.g., UEs 120) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 120a) to another subordinate entity (e.g., another UE 120) without relaying that communication through the scheduling entity (e.g., UE 120 or BS 110), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations, resource reservations, and other parameters used for data transmissions, and the PSSCH may carry the data transmissions. The PSFCH may carry feedback such as CSI related to a sidelink channel quality. In some systems (e.g., NR Release 16), a two stage SCI may be supported. Two stage SCI may include a first stage SCI (SCI-1) and a second stage SCI (e.g., SCI-2). SCI-1 may include resource reservation and allocation information, information that can be used to decode SCI-2, etc. SCI-2 may include information that can be used to decode data and to determine whether the UE is an intended recipient of the transmission. SCI-1 and/or SCI-2 may be transmitted over PSCCH.

NR concurrent radio-access technology (RAT) operation generally refers to operating multiple simultaneous active connections with at least one connection being on NR. For example, the two connections may involve LTE and NR connections, or both NR connections. Multi-SIM devices are able to connect to multiple networks independently without network awareness. Different UE behaviors may occur based on different implementations like dual-SIM dual active (DSDA) or dual-SIM dual standby (DSDS). DSDS generally refers to a dual-SIM deployment where the two SIM cards of the UE may be unable to simultaneously generate traffic. DSDA on the other hand refers to a dual-SIM deployment where both SIM cards of the UE may be active at the same time. As used herein, a SIM generally refers to both virtual and hardware implementations of a SIM. In other words, each SIM may be implemented using hardware (e.g., a physical SIM card) on the multi-SIM device, or implemented virtually using a remote database.

Dual SIM receivers allow the different SIMS to support a variety of different combination options. For example, dual-SIM (DSIM) devices could support the following:

SA-NR+SA-NR: both SIMS could support standalone (SA) NR (SA-NR);

NSA-NR+LTE: one SIM supports non-standalone (NSA) while another SIM supports LTE;

LTE+LTE: both SIMS support LTE;

LTE+W: one SIM supports LTE, the other supports wideband CDMA; or any other combination (X RAT+X RAT both SIMS the same RAT or X RAT+Y RAT the SIMS support different RATs).

In some cases, in a multi-SIM deployment, each SIM of the UE can belong to the same network carrier. For example, two or more SIMS (also referred to herein as subscribers or SUBs) belonging to the same operator can be in the following modes:

(1) Idle+Idle: 2 or more SUBs in Idle camp to the same cell (2) Connected+Idle: 1 SUB in Idle and 1 Sub Connected camp to the same cell In conventional multi-SIM deployments, in scenarios where the UE is performing a low priority activity via a first SIM and another high priority activity is triggered on the same or different SIM of the UE, the high priority activity may be delayed, significantly impacting the performance of the UE. For example, assume an out of service indication is triggered on a SIM while another (or same) SIM is performing CSG autonomous search function. In this example, the recovery from the out of service may be delayed due to the CSG autonomous search, which may involve performing measurements for multiple CSG cells, performing a full band scan to obtain a given CSG cell, etc. These measurements and band scans may utilize RF resources of the UE, causing tune aways and increasing the delay time for out of service recovery on the SIM in which the out of service indication is triggered on.

In some examples, in scenarios where a PS call/throughput is triggered on a SIM while another (or same) SIM is performing CSG autonomous search function, the triggered SIM may experience throughput degradation due to the CSG autonomous search function. In some examples, in scenarios where a SIM is not running throughput but the network sends measurement to the SIM for NR addition while another (or same) SIM is performing CSG autonomous search function, there may be a delay in NR measurements, additions/deletions/configurations, etc., in the triggered SIM, due to tune aways triggered from the CSG autonomous search function. In some examples, in scenarios where a network is running a timer for a given NR configuration on a SIM and there is a delay on that configuration, the network may delete NR object(s) and deactivate NR from that SIM.

Figure 3:
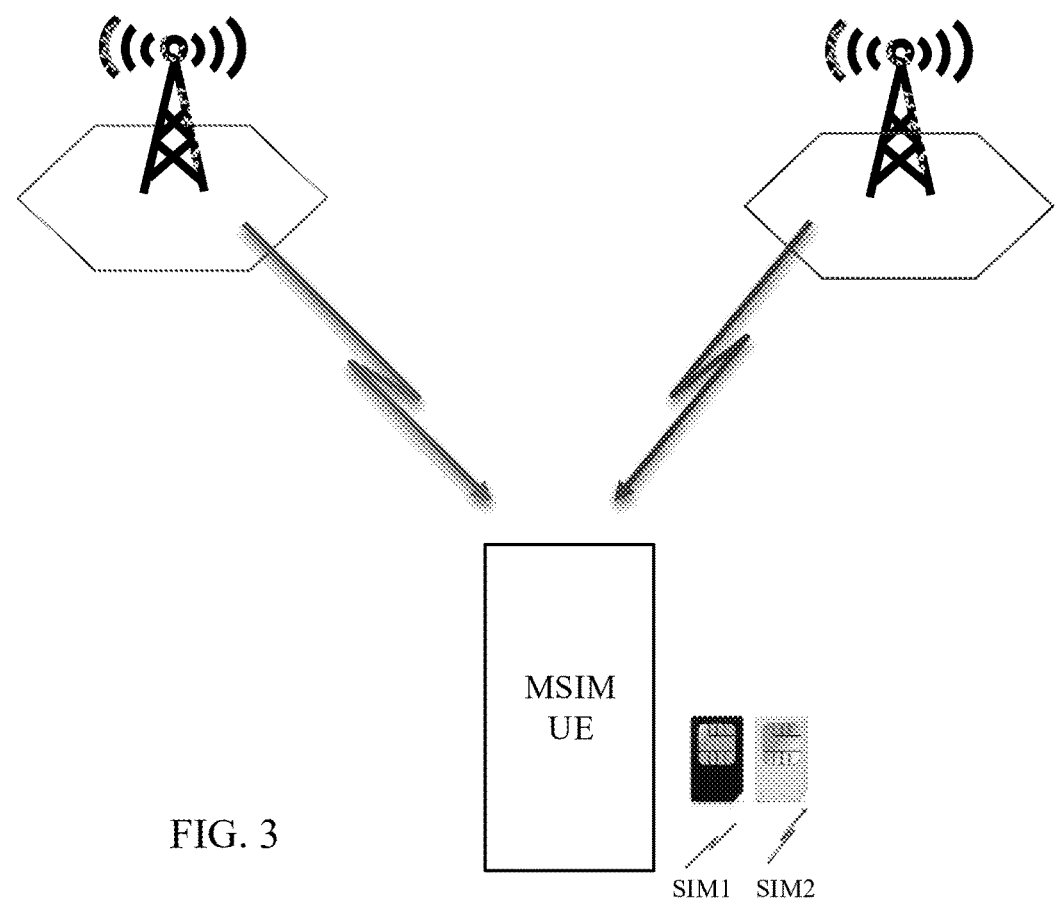
FIG. 3 illustrates an example multi-SIM deployment for a UE, in accordance with certain aspects of the present disclosure.

Example Method of UE Assisted Enablement from UE to Network on Preferred Resource in an MSIM Device FIG. 3 illustrates an example multi-SIM (MSIM) deployment, in which a UE supports multiple SIMS (SIM1 and SIM2), which may support the same or different radio access technologies (RATs). At any given time, the multiple SIMS may concurrently be in an idle state and may support different modes of operation. For example, a UE with a single receiver may support a Single Receive Dual SIM Dual Standby (SR-DSDS) mode, where only one RAT is received at a time. In a Dual Receive (DR)-DSDS mode, the MSIM UE may simultaneously multiple RATs at a time.

Figure 4:
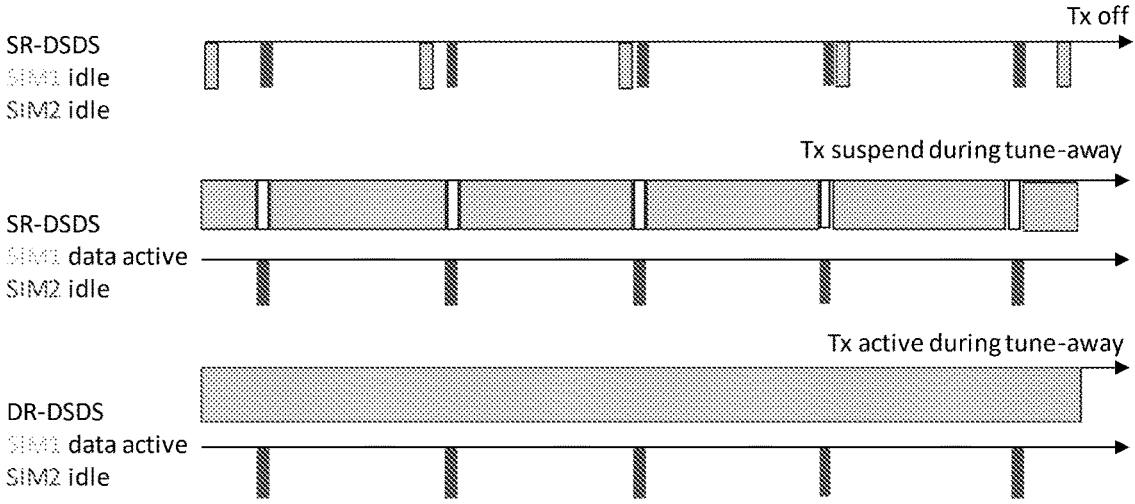
FIG. 4 illustrate timelines of multi-SIM access.

FIG. 4 shows various example scenarios for SR-DSDS and DR-DSDS when SIM1 and SIM2 are active at the same time for SR-DSDS, SR-DSDS. As illustrated, in the SR-DSDS examples, the transmitter may be alternately off to service the different SIMS or the UE may suspend operations on one SIM to tune-away and monitor for transmission on the other SIM. In the DR-DSDS case, the transmitter may be active during a tune-away. For data transmissions, there is the potential to tune-away from one SIM to monitor an idle SIM (tech) for reception. For voice applications, the idle SIM may be completely suspended (while serving voice on the active SIM)

For an MSIM device, if two subscribers (SUBs-corresponding to the two SIMS) camp on the same cell with the same RAT, it is possible to leverage one protocol stack to perform idle activities of the other SUB. This approach may have benefits, for example, if a packet switched (PS) data SUB by avoiding radio frequency (RF) conflict and tuning overhead in many cases.

However, for some cases, such as when the connected SUB serving cell is not the best cell for idle camping (for the idle SUB), it may be suboptimal for the UE to have the idle SUB blindly follow the connected SUB.

Another case where it may be suboptimal for the UE to have the idle SUB blindly follow the connected SUB is when the connected SUB active bandwidth part (BWP) does not contain the idle SUB paging resource at all. This scenario would be complex at UE to cover two BWPs (the active and idle SUB BWPs) at the same time.

Aspect of the present disclosure, however, provide an option if a UE prefers to balance both the connected SUB performance and the idle SUB performance by indicating, to the network, a preferred resource setting for MSIM operation. As will be described herein, the indication may be provided using a standard framework, such as UE assistance information signaling.

Figure 5:
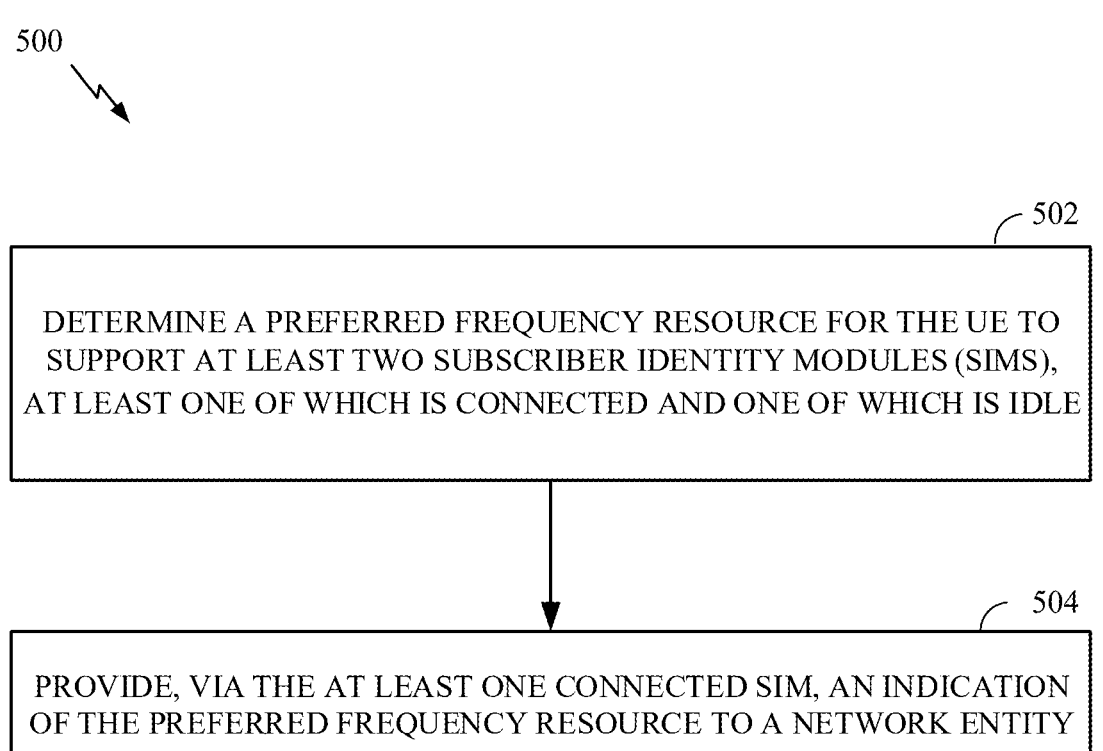
FIG. 5 illustrates example operations for wireless communication by a UE, in accordance with certain aspects of the present disclosure.

FIG. 5 illustrates example operations 500 for wireless communication by a UE, in accordance with certain aspects of the present disclosure. The operations 400 may be performed by a UE (e.g., UE 120a in the wireless communication network 100) equipped with multiple SIMS.

Operations 500 begin, at 502, by determining a preferred frequency resource for the UE to support at least two subscriber identity modules (SIMs), at least one of which is connected and one of which is idle. For example, as will be described in greater detail below, a UE configured with multiple BWPs may select one or more of the configured BWPs that provides a better balance of service for both SIMs than other BWPs and/or results in reduced complexity (e.g., BWP switching).

At 504, the UE provides, via the at least one connected SIM, an indication of the preferred frequency resource to a network entity. For example, the UE may provide the indication using extension bits of a UE Assistance information element (IE).

Figure 6:
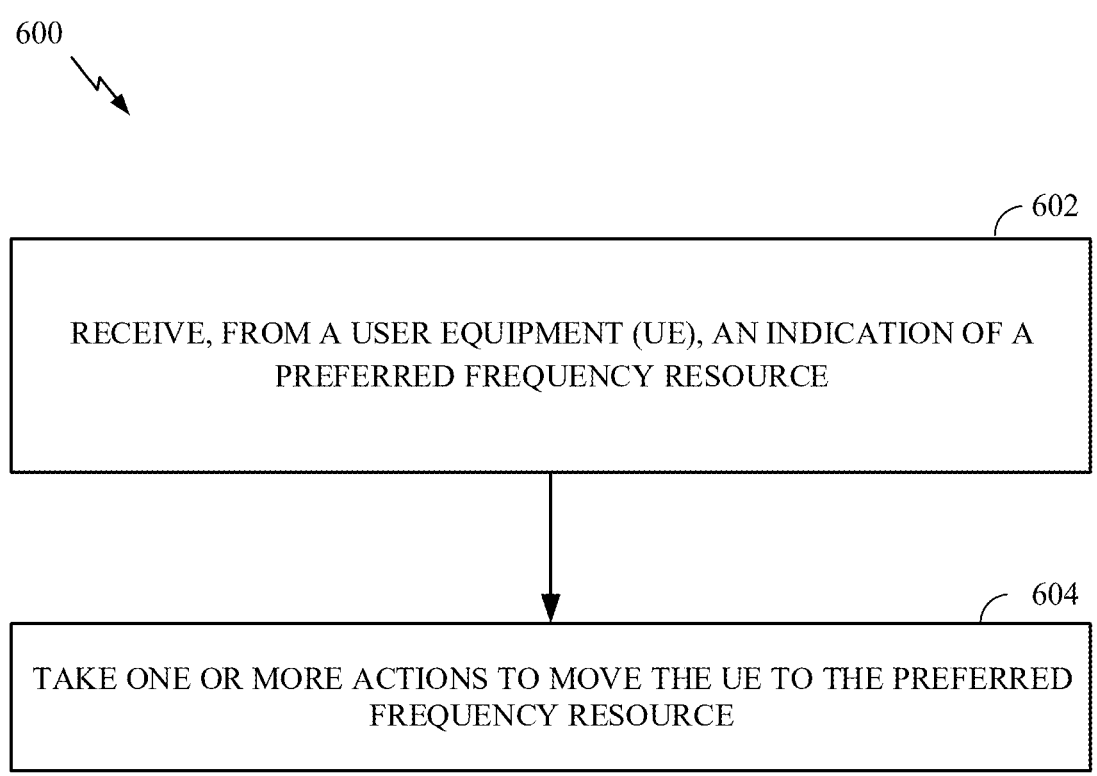
FIG. 6 illustrates example operations for wireless communication by a network entity, in accordance with certain aspects of the present disclosure.

FIG. 6 illustrates example operations 600 for wireless communication by a network entity that may be considered complementary to operations 500 of FIG. 5. For example, operations 600 may be performed by a gNB to receive and process an indication of preferred MSIM resources provided by a UE performing operations 500 of FIG. 5.

Operations 600 begin, at 602, by receiving, from a user equipment (UE), an indication of a preferred frequency resource. As noted above, the indication may be received as UE assistance information.

At 604, the network entity takes one or more actions to move the UE to the preferred frequency resource. For example, the network entity may configure the UE according to the preferred frequency resource (e.g., configured the UE with and/or switching the UE to an indicated preferred BWP).

The techniques presented herein may help balance the performance both connected SUB and the idle SUB, which could be on the same serving cell and, in some cases, may help simplify implementation (e.g., reducing signaling and/or switching overhead).

Figures 7A, 7B:
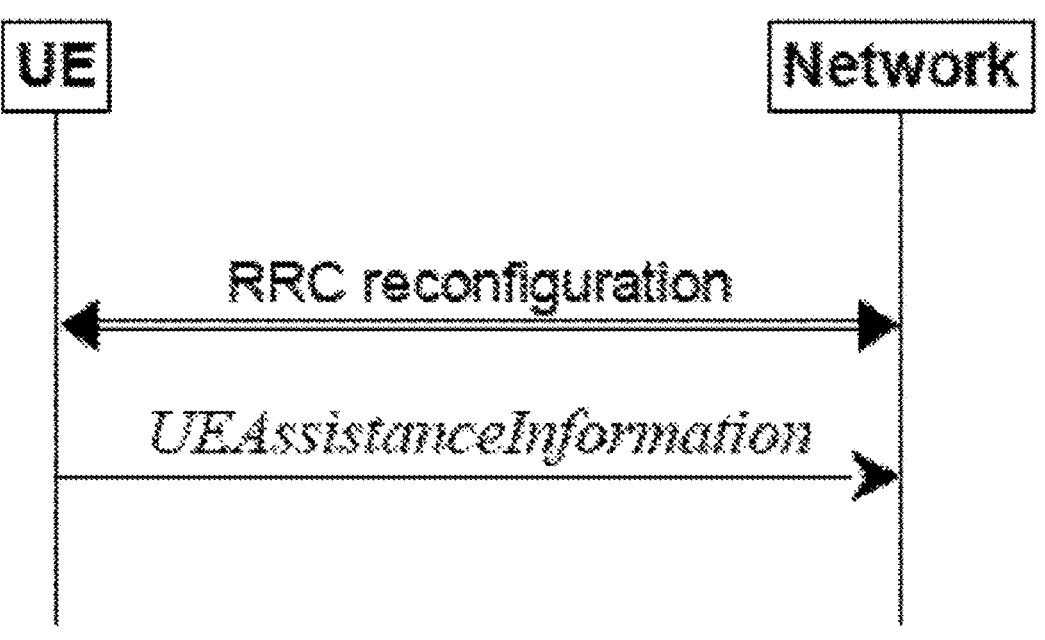
FIG. 7A illustrates an example call flow diagram showing how UE Assistance Information may be used to convey preferred frequency resource for MSIM operation, in accordance with certain aspects of the present disclosure.
FIG. 7B illustrates example an extension field that may be used to convey preferred frequency resource for MSIM operation via UE Assistance Information, in accordance with certain aspects of the present disclosure.

FIG. 7A illustrates an example call flow diagram showing how UE Assistance Information may be used to convey preferred frequency resource for MSIM operation, in accordance with certain aspects of the present disclosure. The preferred frequency resource may be, for example, a preferred target serving cell (or corresponding frequencies) or preferred BWPs. The preferred frequency resource may be selected based on an aggregated evaluation of the two (or more) SUBs in the MSIM device. The UE Assistance information may be conveyed, for example, via a connected SUB.

A UE Assistance Information procedure is intended to indicate various UE information to the network, such as a defined delay budget report, connected discontinuous reception (CDRX) length, and/or overheating assistant information.

In some cases, an existing field, such as a nonCriticalExtension field shown in FIG. 7B, in an information element (IE) defined for a UE Assistance Information procedure may be used to indicate, to the network on the connected SUB, the preferred frequency resource. In such cases, the UE and network may agree on the specific extension on the bits/strings in the UE Assistance Information and their corresponding meanings.

Figure 8A:
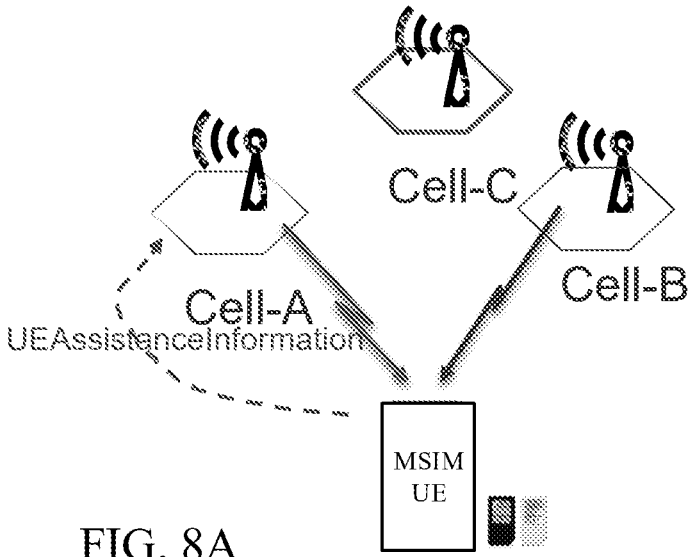
FIGS. 8A and 8B illustrate an example of how a UE may be handed over to a different cell based on an indication of a preferred frequency resource for MSIM operation, in accordance with certain aspects of the present disclosure.
Figure 8B:
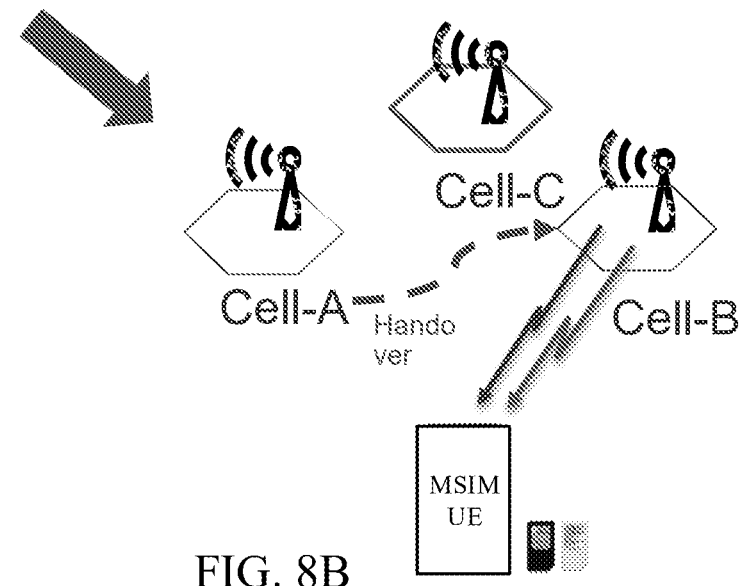

FIGS. 8A and 8B illustrate an example of how a UE may be handed over to a different cell based on an indication of a preferred frequency resource for MSIM operation, in accordance with certain aspects of the present disclosure.

The example assumes, in FIG. 8A, that a connected SUB1 is on cell A and idle SUB2 is on cell-B. The UE may indicate, via UE Assistance information, a preferred cell by sending the index of the configured measurement object. The network may configure a measurement object corresponding to a preferred cell (frequency), which may be used to indicate the preferred cell in the non critical extension as follows:

```
UEAssistanceInformation-v1540-Ies->nonCriticalExtension
{
    preferredMeasObjectId        INTEGER (1..maxNrofObjectId)
    preferredCPI                 PhysCellId
}
```

As shown in FIG. 8B, based on the preferred target cell, the network may handover SUB1 from Cell A to Cell B. As noted above, in some cases, the UE may indicate the preferred target cell by indicated the measurement object ID (measId) for corresponding carrier frequency. As shown above, as an alternative or in addition, the UE may also indicate the preferred cell id (such as the physical cell ID of the SUB2 serving cell, cell-B in this example). In response, the network may sends a radio resource control (RRC) Reconfiguration message to handover the UE (from Cell A to Cell B).

Figure 9A:
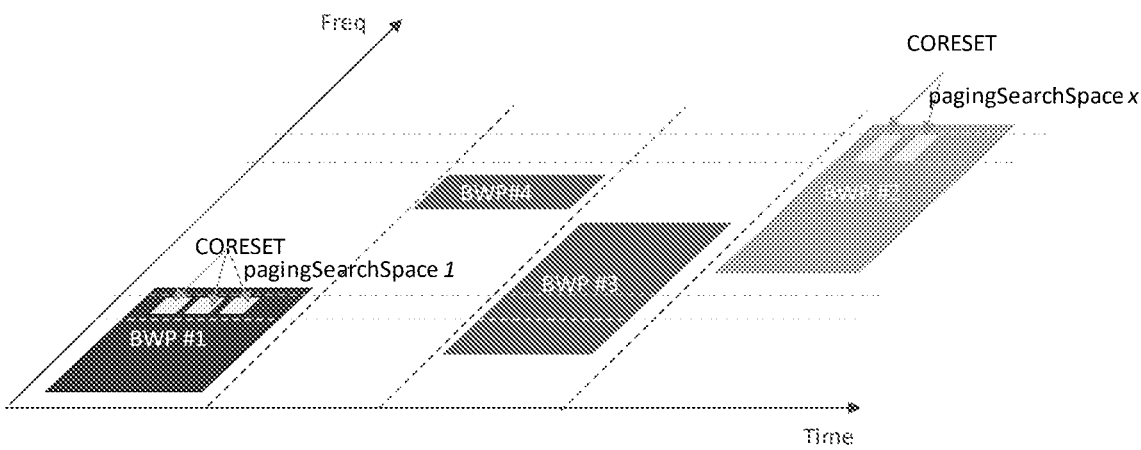
FIGS. 9A and 9B illustrate an example of how a UE may be configured with BWPs based on an indication of a preferred frequency resource for MSIM operation, in accordance with certain aspects of the present disclosure.
Figure 9A:
Figure 9B:
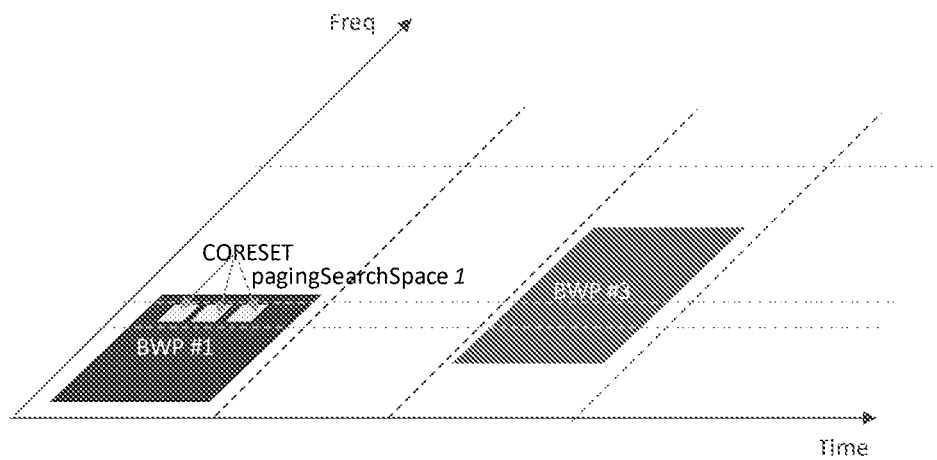

FIGS. 9A and 9B illustrate an example of how a UE may be configured with BWPs based on an indication of a preferred frequency resource for MSIM operation, in accordance with certain aspects of the present disclosure.

The example assumes that the MSIM UE SUB1 is in SUB1 in RRC_CONNECTED with multiple BWPs configured. In such cases, via DCI-based BWP switching, the BWP for the UE may change relatively frequently, which may create some challenges. For example, if the active BWP (of the connected SUB) does not contain the idle paging frequency resource (of the idle SUB), it would be more complex in implementation for the MSIM device to monitor the connected SUB BWP and the idle SUB BWP simultaneously (e.g., may require additional BWP switching).

This is illustrated by the example of FIG. 9A, which assumes up to four BWP #1, #2, #3, #4 are configured in connected SUB1. The example further assumes that the idle SUB2 CORESET (e.g., defined by pagingSearchSpace in SIB1) is located in BWP #1 and BWP #3, but NOT in BWP #2 or BWP #4.

Thus, via UEAsistanceInformation, the connected SUB1 could indicate, to the network that only BWP #1 and BWP #3 are preferred. In other words, using these BWPs, the DCI based BWP switch would be on the BWPs with idle SUB2 paging resource available, which would allow the MSIM UE to monitor the active BWP and idle SUB2 paging simultaneously. This indication of preferred BWPs may be provided via the non critical extension as follows as follows:

```
UEAssistanceInformation-v1540-Ies->nonCriticalExtension
{
    preferredBWPs  SEQUENCE (SIZE (1..maxNrofBWPs)) OF BWP-Id
}
```

As described above, the techniques presented herein may help balance the performance both connected SUB and the idle SUB by specifying a preferred frequency resource, such as a preferred target serving cell or preferred BWPs.

FIG. 10 illustrates a communications device 1000 that may include various components (e.g., corresponding to means-plus-function components) configured to perform operations for the techniques disclosed herein, such as the operations illustrated in FIG. 5. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/ memory 1012 is configured to store instructions (e.g., computer-executable code) that when executed by the processor 1004, cause the processor 1004 to perform the operations illustrated in FIG. 5, or other operations for performing the various techniques discussed herein. In certain aspects, computer-readable medium/memory 1012 stores code 1014 for determining a preferred frequency resource for the UE to support at least two subscriber identity modules (SIMs), at least one of which is connected and one of which is idle; and code 1016 for providing, via the at least one connected SIM, an indication of the preferred frequency resource to a network entity. In certain aspects, the processor 1004 has circuitry configured to implement the code stored in the computer-readable medium/memory 1012. The processor 1004 includes circuitry 1026 for determining a preferred frequency resource for the UE to support at least two subscriber identity modules (SIMs), at least one of which is connected and one of which is idle; and circuitry 1028 for providing, via the at least one connected SIM, an indication of the preferred frequency resource to a network entity.

FIG. 11 illustrates a communications device 1100 that may include various components (e.g., corresponding to means-plus-function components) configured to perform operations for the techniques disclosed herein, such as the operations illustrated in FIG. 6. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/ memory 1112 is configured to store instructions (e.g., computer-executable code) that when executed by the processor 1104, cause the processor 1104 to perform the operations illustrated in FIG. 5, or other operations for performing the various techniques discussed herein. In certain aspects, computer-readable medium/memory 1112 stores code 1114 for obtaining, from a user equipment (UE), an indication of a preferred frequency resource; and code 1116 for taking one or more actions to move the UE to the preferred frequency resource. In certain aspects, the processor 1104 has circuitry configured to implement the code stored in the computer-readable medium/memory 1112. The processor 1104 includes circuitry 1126 for obtaining, from a user equipment (UE), an indication of a preferred frequency resource; and circuitry 1128 for taking one or more actions to move the UE to the preferred frequency resource.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity.

A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices. Also, the wireless node can be a UE or a BS or a network entity.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, processors 258, 264 and 266, and/or controller/processor 280 of the UE 120a and/or processors 220, 230, 238, and/or controller/processor 240 of the BS 110a shown in FIG. 2 may be configured to perform operations 500 of FIG. 5 and/or operations 600 of FIG. 6.

Means for receiving may include a transceiver, a receiver or at least one antenna and at least one receive processor illustrated in FIG. 2. Means for transmitting, means for sending or means for outputting may include, a transceiver, a transmitter or at least one antenna and at least one transmit processor illustrated in FIG. 2. Means for determining, means for providing, means for taking one or more actions, means for selecting, and means for simultaneously monitoring may include a processing system, which may include one or more processors, such as processors 258, 264 and 266, and/or controller/processor 280 of the UE 120a and/or processors 220, 230, 238, and/or controller/processor 240 of the BS 110a shown in FIG. 2.

In some cases, rather than actually transmitting a frame a device may have an interface to output a frame for transmission (a means for outputting or means for providing). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 5 and 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), the method comprising:

determining at least one of: a preferred target serving cell or a preferred bandwidth part (BWP) for the UE to support at least two subscriber identity modules (SIMs), wherein at least one SIM is connected and at least one SIM is idle; and providing, via the at least one SIM that is connected, a UE assistance message via a radio resource control (RRC) information element to a network entity, wherein the RRC IE includes an extension field indicating the at least one of the preferred target serving cell or the preferred BWP.

2. The method of claim 1, wherein the indication of the preferred target serving cell is provided via at least one of: an index of a configured measurement object or a physical cell identifier (PCI) of the preferred target serving cell.

3. The method of claim 1, wherein:

the UE is configured with multiple BWPs that support dynamic BWP switching; and the determination of the preferred BWP comprising selecting the preferred BWP that contains a paging frequency resource of the at least one idle SIM.

4. The method of claim 3, further comprising:

receiving signaling switching the UE to the preferred BWP; and simultaneously monitoring the preferred BWP for communications on the at least one connected SIM and for paging on the at least one idle SIM.

5. The method of claim 1, further comprising:

receiving a RRC Reconfiguration message to handover the UE to the preferred target serving cell.

6. A method for wireless communications by a network entity, the method comprising:

receiving, from a user equipment (UE), a UE assistance message via a radio resource control (RRC) information element including an extension field indicating a preferred frequency resource at least one of: a preferred target serving cell or a preferred bandwidth part (BWP) for the UE to support at least two subscriber identify modules (SIMs), wherein at least one SIM is connected and at least one SIM is idle; and taking one or more actions to move the UE to the at least one of: the preferred target serving cell or the preferred BWP.

7. The method of claim 6, wherein the indication of the preferred target cell is received via at least one of: an index of a configured measurement object or a physical cell identifier (PCI) of the preferred target serving cell.

8. The method of claim 7, wherein the one or more actions comprise sending the UE a RRC Reconfiguration message to handover the UE to the preferred target serving cell.

9. The method of claim 6, wherein:

the UE is configured with multiple BWPs that support dynamic BWP switching; and the one or more actions comprise switching the UE to the preferred BWP.

10. A user equipment (UE), comprising:

means for determining at least one of: a preferred target serving cell or a preferred bandwidth part (BWP) for the UE to support at least two subscriber identity modules (SIMs), wherein at least one SIM is connected and at least one SIM is idle; and means for providing, via the at least one SIM that is connected, a UE assistance message via a radio resource control (RRC) information element to a network entity, wherein the RRC IE includes an extension field indicating the at least one of the preferred target serving cell or the preferred BWP.

11. The UE of claim 10, wherein the indication of the preferred target serving cell is provided via at least one of: an index of a configured measurement object or a physical cell identifier (PCI) of the preferred target serving cell.

12. The UE of claim 10, wherein:

the UE is configured with multiple BWPs that support dynamic BWP switching; and the means for determining the preferred BWP comprising means for selecting the preferred BWP that contains a paging frequency resource of the at least one idle SIM.

13. The UE of claim 12, further comprising:

means for receiving signaling switching the UE to the preferred BWP; and means for simultaneously monitoring the preferred BWP for communications on the at least one connected SIM and for paging on the at least one idle SIM.

14. The UE of claim 10, further comprising:

means for receiving a RRC Reconfiguration message to handover the UE to the preferred target serving cell.

15. A network entity, comprising:

means for receiving, from a user equipment (UE), a UE assistance message via a radio resource control (RRC) information element including an extension field indicating a preferred frequency resource at least one of: a preferred target serving cell or a preferred bandwidth part (BWP) for the UE to support at least two subscriber identify modules (SIMs), wherein at least one SIM is connected and at least one SIM is idle; and means for taking one or more actions to move the UE to the at least one of: the preferred target serving cell or the preferred BWP.

16. The network entity of claim 15, wherein the indication of the preferred target cell is received via at least one of: an index of a configured measurement object or a physical cell identifier (PCI) of the preferred target serving cell.

17. The network entity of claim 16, wherein the one or more actions comprise sending the UE a RRC Reconfiguration message to handover the UE to the preferred target serving cell.

18. The network entity of claim 15, wherein:

the UE is configured with multiple BWPs that support dynamic BWP switching; and the one or more actions comprise switching the UE to the preferred BWP.

19. A user equipment (UE), comprising:

a processing system configured to determine at least one of: a preferred target serving cell or a preferred bandwidth part (BWP) for the UE to support at least two subscriber identity modules (SIMs), wherein at least one SIM is connected and at least one SIM is idle;

an interface configured to provide, via the at least one SIM that is connected, a UE assistance message via a radio resource control (RRC) information element to a network entity, wherein the RRC IE includes an extension field indicating the at least one of the preferred target serving cell or the preferred BWP; and a transmitter configured to transmit the indication a network entity.

20. The UE of claim 19, wherein the indication of the preferred target serving cell is provided via at least one of: an index of a configured measurement object or a physical cell identifier (PCI) of the preferred target serving cell.

21. The UE of claim 19, wherein:

the UE is configured with multiple BWPs that support dynamic BWP switching; and the processing system determines the preferred BWP by selecting the preferred BWP that contains a paging frequency resource of the at least one idle SIM.

22. The UE of claim 21, further comprising:

a receiver configured to receive signaling switching the UE to the preferred BWP, wherein:

the processing system is further configured to simultaneously monitor the preferred BWP for communications on the at least one connected SIM and for paging on the at least one idle SIM.

23. The UE of claim 19, further comprising:

a receiver configured to receive a RRC Reconfiguration message to handover the UE to the preferred target serving cell.

24. A network entity, comprising:

a receiver configured to receive, from a user equipment (UE), a UE assistance message via a radio resource control (RRC) information element including an extension field indicating a preferred frequency resource at least one of: a preferred target serving cell or a preferred bandwidth part (BWP) for the UE to support at least two subscriber identify modules (SIMs), wherein at least one SIM is connected and at least one SIM is idle; and a processing system configured to take one or more actions to move the UE to the at least one of: the preferred target serving cell or the preferred BWP.

25. The network entity of claim 24, wherein the indication of the preferred target cell is received via at least one of: an index of a configured measurement object or a physical cell identifier (PCI) of the preferred target serving cell.

26. The network entity of claim 25, wherein the one or more actions comprise sending the UE a RRC Reconfiguration message to handover the UE to the preferred target serving cell.

27. The network entity of claim 24, wherein:

the UE is configured with multiple BWPs that support dynamic BWP switching;

and the one or more actions comprise switching the UE to the preferred BWP.

28. An apparatus for wireless communications by a user equipment (UE), comprising:

a processing system configured to determine at least one of: a preferred target serving cell or a preferred bandwidth part (BWP) for the UE to support at least two subscriber identity modules (SIMs), wherein at least one SIM is connected and at least one SIM is idle; and an interface configured to provide, via the at least one SIM that is connected, a UE assistance message via a radio resource control (RRC) information element to a network entity, wherein the RRC IE includes an extension field indicating the at least one of the preferred target serving cell or the preferred BWP.

29. An apparatus for wireless communications by a network entity, the apparatus comprising:

a receiver configured to receive, from a user equipment (UE), a UE assistance message via a radio resource control (RRC) information element including an extension field indicating a preferred frequency resource at least one of: a preferred target serving cell or a preferred bandwidth part (BWP) for the UE to support at least two subscriber identify modules (SIMs), wherein at least one SIM is connected and at least one SIM is idle; and a processing system configured to take one or more actions to move the UE to the at least one of: the preferred target serving cell or the preferred BWP.

30. A non-transitory computer-readable medium for wireless communications by a user equipment (UE), the non-transitory computer-readable medium comprising codes that, when executed by a processor, cause the UE to:

determine at least one of: a preferred target serving cell or a preferred bandwidth part (BWP) for the UE to support at least two subscriber identity modules (SIMs), wherein at least one SIM is connected and at least one SIM is idle; and provide, via the at least one SIM that is connected, a UE assistance message via a radio resource control (RRC) information element to a network entity, wherein the RRC IE includes an extension field indicating the at least one of the preferred target serving cell or the preferred BWP.

31. A non-transitory computer-readable medium for wireless communications by a network entity, the non-transitory computer-readable medium comprising codes that, when executed by a processor, cause the network entity to:

obtain, from a user equipment (UE), a UE assistance message via a radio resource control (RRC) information element including an extension field indicating a preferred frequency resource at least one of: a preferred target serving cell or a preferred bandwidth part (BWP) for the UE to support at least two subscriber identify modules (SIMs), wherein at least one SIM is connected and at least one SIM is idle; and take one or more actions to move the UE to the at least one of: the preferred target serving cell or the preferred BWP.

* * * * *